United States Patent Office 3,358,266
Patented Dec. 12, 1967

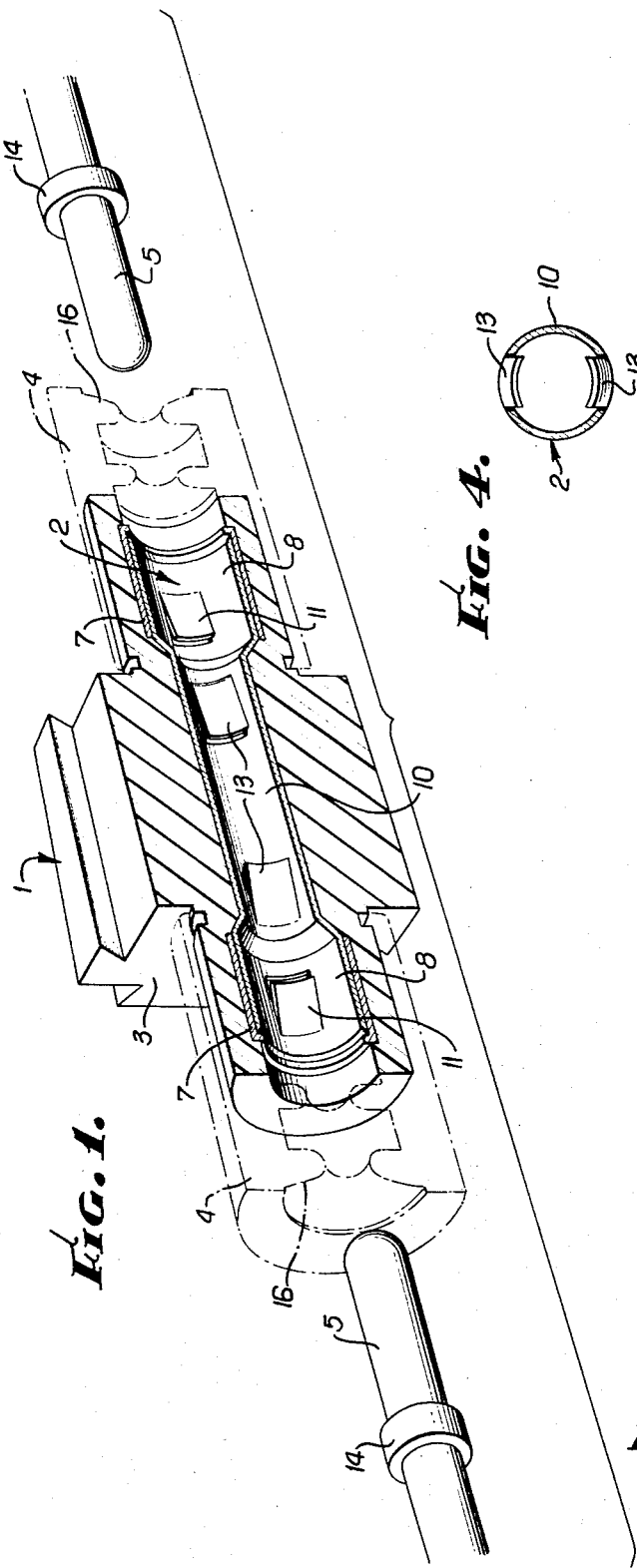
Fig. 1.
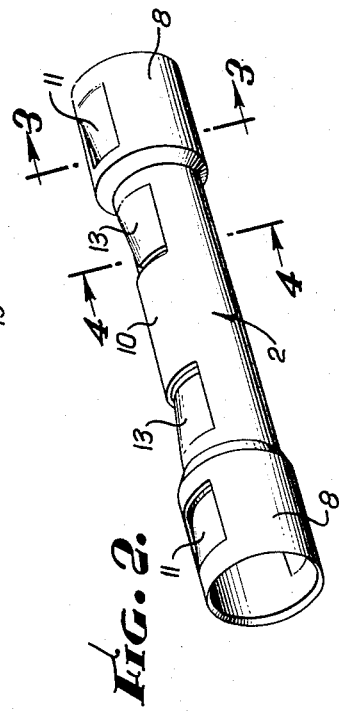
Fig. 2.
Fig. 4.
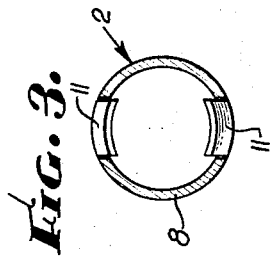
Fig. 3.
INVENTORS.
ALBERT T. CHANDLER
LENNART B. JOHNSON
ATTORNEY.

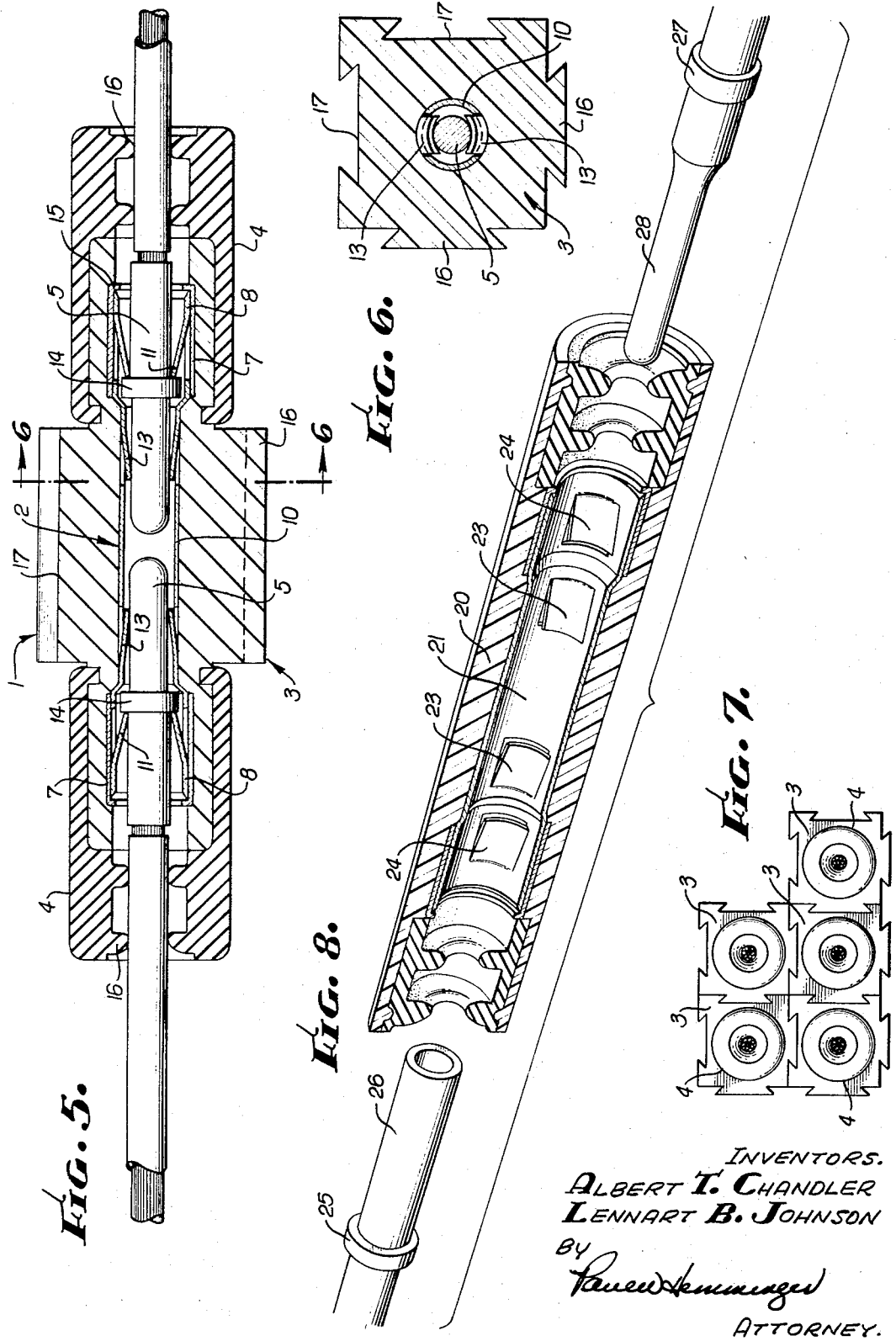

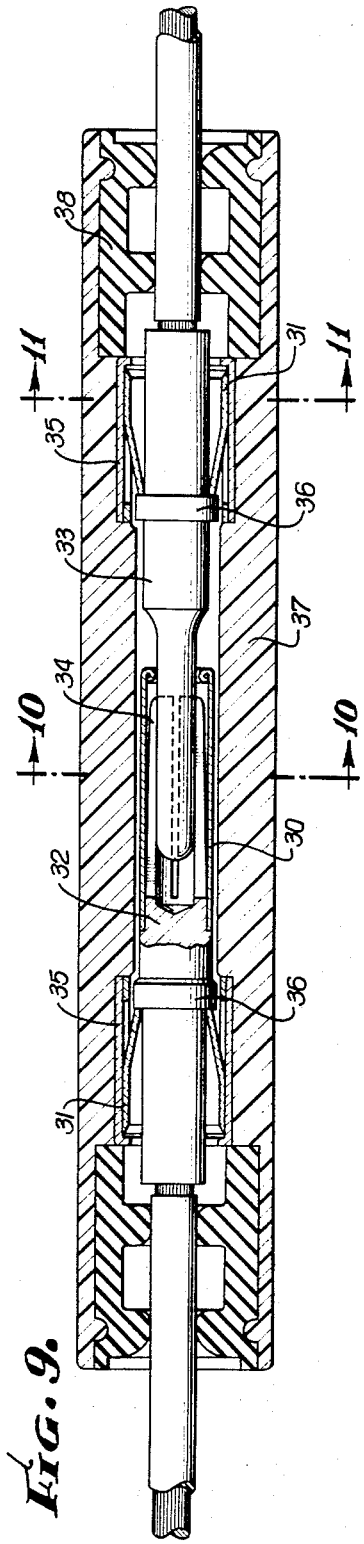
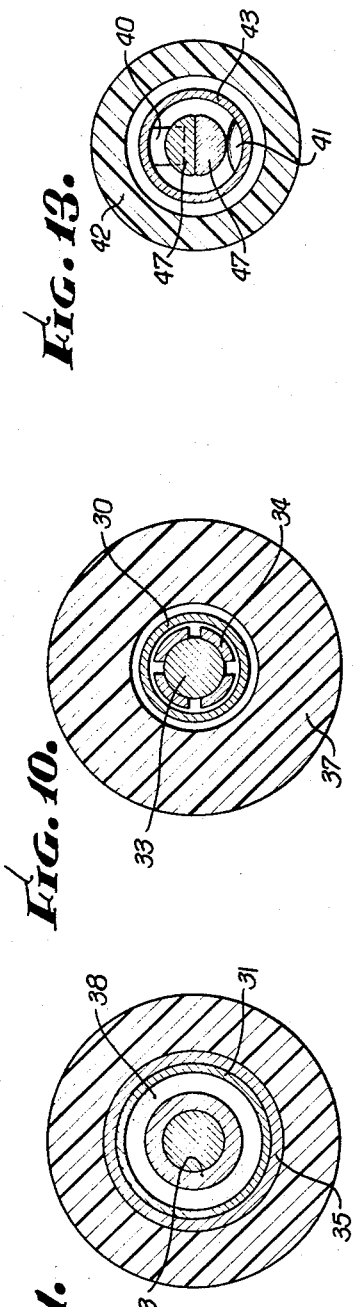
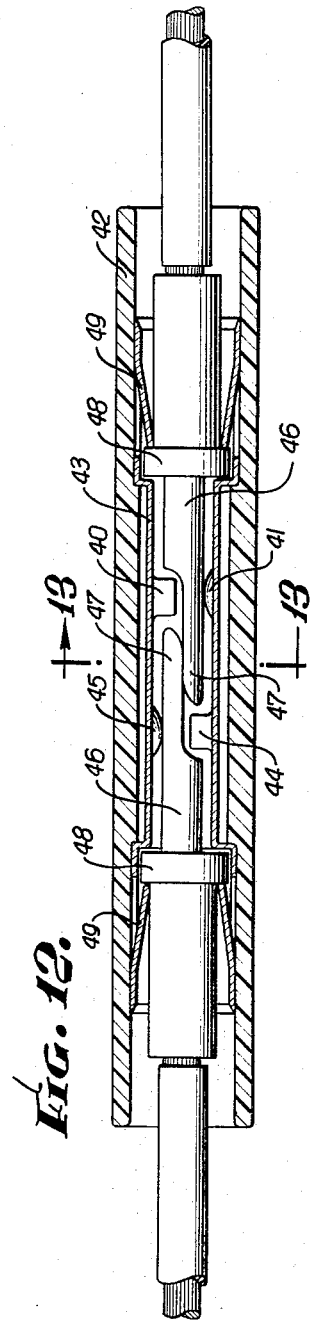

3,358,266
POSITIVE RETENTION DISCONNECTABLE
WIRE SPLICE
Albert T. Chandler, Inglewood, and Lennart B. Johnson, Sherman Oaks, Calif., assignors to International Telephone and Telegraph Corporation, New York, N.Y., a corporation of Maryland
Filed Mar. 17, 1965, Ser. No. 440,460
1 Claim. (Cl. 339—205)

ABSTRACT OF THE DISCLOSURE

The connector or splicing body has openings at opposite sides for receiving male contacts therein and effecting locked interconnection. Each male contact has an enlarged shoulder spaced from an end. A continuous, open-ended ferrule has first portions of its walls formed into tines or fingers for resiliently engaging the male contacts and forming an interconnection via the ferrule body. Second portions of the ferrule walls are formed into fingers that are resiliently snapped into locking engagement with the shoulders of the male contacts when fully positioned within the connector. An insulator body surrounding the connector has locking grooves to accommodate a number of such connectors arranged into a unitary structure.

This invention relates in general to a wire splice for physically and electrically connecting single and multiple wires. Its principal object is to provide a wire splice of the above character which connects the wires in a positive manner with the capability of repeated disconnection and reconnection.

Another object of this invention is to provide a new and improved wire splice of the above character which is extremely light, relatively small, economical in manufacture and reliable in operation.

There are numerous applications for wire splices, such as a wire splice in a wire bundle; a connector for instrument panels; and a splice or connector which can be used as a check or probe point by releasing one of the wires for test measurements of the released wire or splice socket.

Known wire splices can be divided into two main categories—permanent and disconnect splices. The permanent splices can be further grouped into butt splices and parallel splices while the disconnect splices can be grouped into twist-lock disconnect splices; straight-pull ball-disconnect splices; swivel-disconnect splices; and straight-pull friction-disconnect splices.

One of the basic disadvantages of permanent splices is that the splice is permanent and consequently the spliced wires cannot be separated to correct failures or re-wiring without severing the splice and replacing it with a new splice. Another disadvantage is that permanent splices are difficult to insulate and/or seal, particularly when three or more wires are to be joined at one connector. Accordingly, it is a further object of this invention to provide a two-wire or multi-wire permanent splice having all of the advantages of disconnectable splices yet being readily insulatable and sealable.

One of the disadvantages of disconnectable splices is the possibility of accidental disconnect since these disconnectable splices do not have positive methods of locking. For example, the friction type splices can be inadvertently disconnected through tension in the wires; and the twist-lock devices can be separated by a combination of tension or compression and vibration. Also, like permanent splices, the known disconnectable wire splices are difficult and expensive to insulate and/or seal. Accordingly, it is still another object of this invention to provide a wire splice which has the advantage of a permanent splice regarding permanency together with advantages of disconnectable splices regarding replaceability, and which is readily adaptable for insulating and/or sealing operations.

Another object is to provide a wire splice which can be utilized as a single connector for two wires, or can be grouped with other splices to serve as multi-wire splice or bus, each application being readily adaptable for open-current testing or rewiring without damage to the wire being connected.

Other objects and features of this invention will become apparent and the invention will be best understood when the specification and claim are read in conjunction with the accompanying drawings comprising FIGS. 1 to 13, in which:

FIG. 1 shows a pictorial representation, in section of a preferred embodiment of the inventive wire splice;

FIG. 2 shows a complete pictorial representation of the wire retention or clip portion of the wire splice of FIG. 1;

FIGS. 3 and 4 show sectional views of portions of the retention clip of FIG. 2 taken along lines 3—3 and 4—4 of FIG. 2;

FIG. 5 shows a sectionalized view of the wire splice of FIG. 1 with two straight pin contacts locked in a "permanent," yet releasable position;

FIG. 6 shows a cross-sectional view of the wire splice of FIG. 5 taken along lines 6—6 to show the configuration of the wire splice body;

FIG. 7 shows a cross sectional view of a number of wire splices of FIG. 1 assembled in modular form;

FIG. 8 shows another embodiment of the invention similar to that of FIG. 1 with the interlocking body insulation eliminated to provide a small cylindrical wire splice and arranged for interconnecting a straight pin contact with a straight bore socket;

FIG. 9 shows still another embodiment of the invention wherein a pair of electrically disassociated retention clips are provided for use with a pin and socket contact arrangement;

FIGS. 10 and 11 show cross-sectional views of the wire splice of FIG. 9 taken along lines 10—10 and 11—11, respectively;

FIG. 12 shows a sectional view of a wire splice for retaining a polarized hermaphroditic contact assembly; and FIG. 13 shows a cross sectional view of the wire splice of FIG. 12 taken along lines 13—13.

Referring now to FIG. 1 of the drawings, the wire splice 1 consists of a unitary double-ended retention clip 2 molded or suitably secured in a body insulator 3 and including a sealing type grommet 4 located at each end of the splice. A pair of straight pin contacts 5 are shown in position for insertion into the wire splice 1 for physical and electrical interconnection. A pair of ferrules or sleeves 7 are shown in encircling relationship with the end portions of clip 2.

As best seen in FIG. 2, the retention clip 2 is of generally cylindrical shape with the end portions 8 having a diameter larger than the central shank or reduced portion 10.

Each end portion 8 includes one or more locking tangs or fingers 11 which are tab-like projections stamped or suitably formed from the end portions and are bent inwardly so that the shoulder stop or free end 12 of the tangs 11 lie within the confines of the end portions 8. The position of the tangs 11 relative to the end portions 8 are best seen in FIG. 3. While not necessary, it is preferred that the shoulder stop 12 generally have a straight edge.

The central portion or shank 10 of the retention clip shown in FIGS. 1 and 4 has one or more electrical contacting tines or fingers 13 which are located intermediate the end portions 8. These electrical tines or fingers 13 are stamped from the shank 10 with the free end thereof projecting inwardly into the confines of the shank 10. The position of the free ends of tines 13 with respect to the shank 10 is shown most clearly in FIG. 4.

Referring now to FIG. 5 of the drawings, the cooperation between the wire splice 1 and contacts 5 will be described.

The pin contacts 5 include an enlarged portion or collar 14 extending around the periphery of the pin contacts and cooperate with tanks 11 to mechanically lock the contacts 5 in position within the wire splice with the front portion of the contacts in electrical contact with tangs 13.

When a pin contact 5 is inserted in the wire splice 1, the ferrule 7 guides the end of the pin contact into axial alignment with the end portions 8 of the clip 2 by virtue of a flange or lip 15 formed on the outermost end of ferrule 7. Ferrule 7 in addition to providing a guide to prevent damage to the tangs 11, also prevents distortion of tangs 11 beyond their elastic limits.

As the end of the pin contact 5 passes through the end portion 8 of the clip 2 and enters the shank portion 10 thereof, it engages the conducting tines 13 and urges them outwardly but continuously in electrical association with the pin contact. At the same time, the forward portion of shoulder 14, which may be beveled, engages the locking tangs 11 and urges them outwardly to permit the passage of the shoulder 14 therethrough.

When the shoulder 11 of each pin contact passes completely past the free ends of the respective tangs 11, the inward tension of the tangs 14 causes the free ends thereof to snap into their illustrated position in FIG. 5, locking the pin contact 5 against removal.

At this time, an electrical connection, under spring tension is established between the two pin contacts, through their respective tangs 13 and through the shank portion 10 of clip 2. The beads or lips 16 of the grommet 4 sealingly engage the insulation on the wire associated with the pin contacts. In this manner a physical and electrical splice, completely insulated and sealed, is "permanently" established.

In order to release any pin contact, a cylindrical tool of the type disclosed in United States Patent No. 3,110,093, issued Nov. 12, 1963, to G. S. Johnson, and entitled "Contact Extraction and Insertion Tool," is placed over the wire and pressed inwardly toward the center of the wire splice. The wall thickness of the tool is substantially equal to the height of shoulder 14 and thus urges the tangs 11 out of latching engagement with shoulder 14. Thereafter, the pin contact 5 and the tool may be readily removed, resulting in a disconnect of the wire splice.

FIG. 6 shows a cross-sectional view of the wire splice and illustrates the particular exterior configuration of the insulator body 3. It will be noted that the projections 50 are complementary to the cavities 17 to permit the assembly of modular structure such as shown in FIG. 7. It can be seen from FIG. 7 that any number and shape of splice assemblies can readily be formed.

While the wire splices of FIG. 7 are shown as separate splices arranged in interlocking relationship, it is to be understood that the multi-splice structure could be unitary with multiple contact cavities, to provide a two-contact, four-contact or multi-contact splice.

It is an axiom that for reliability in separable connections or splices that the electrical connection to a contact must be under tension. Accordingly, split pin sockets or contractable pin contacts are normally used together. However, the cost of providing such spring-loaded electrical connections becomes substantial and a straight bore pin socket is desirable in many instances where cost reduction is necessary.

FIG. 8 shows a wire splice 20 utilizing a retention clip 21 similar to the retention clip 2 of FIGS. 1 and 2 wherein a straightbore pin socket may be used with reliability since electrical connection under spring tension is accomplished through conducting tangs or fingers 23. The locking tangs 24, cooperating with the shoulder 25 of pin socket 26 and shoulder pin 27 of contact 28, lock the contact in a "permanent" position in the manner described in connection with FIGS. 1 through 5. At the same time, tangs 23 contact the socket 26 and pin 27 for the required electrical contact under tension.

FIG. 9 shows a wire splice having two separate retention clips 31 electrically separated from each other. This type of wire splice can be used reliably with a split socket 32 and pin contact 33. In FIG. 9, the split socket 32 includes flexible fingers 34, surrounded by a protective sleeve 30. The fingers 34 are tensioned inwardly and are flexed outwardly or dilated to permit encircling engagement of the pin contact 33 under spring tension.

As dscribed above in connection with the unitary double-ended retention clip, shoulders 36 of the pin socket and pin contacts to lock them in position for controlled removal only.

The construction of the wire splice of FIG. 9 is such that the body insulator 37 can be molded prior to insertion of the retaining clips 31. The clips 31 may be held in position by a grommet 38 which snaps into position over the bead or lip 39 of the insulator 37. This construction has the advantage that the retention clip may be readily removed for repair or replacement service. The grommet 38 provides a seal as described hereinbefore in connection with FIG. 1.

FIGS. 10 and 11 show cross-sectional views of portions of the wire splice to illustrate the split socket assembly more clearly.

FIG. 12 shows a further embodiment of a wire splice arranged for use with polarized hermaphroditic pin contacts. In place of the electrical tangs 13 of FIGS. 1 and 4, a key 40 and dimple, cam 41 are provided slightly spaced from the central shank portion of the retention clip 43, with the key 40 and cam 41 being diametrically opposed to each other. Similarly, a key 44 and dimple or cam 45 is provided on the retention clip 43 spaced in the opposite direction from the central portion thereof, with the key 40 and cam 45 being in axial alignment with each other as are cam 41 and key 44, each cam and key pair being disposed 180 degrees from each other. The end portions of the clip 43 of FIG. 12 are similar to corresponding end portions of the clips shown in FIGS. 1 and 2.

The pin contacts 46, usable in the wire splice of FIG. 12, each has the projecting end thereof containing a flattened portion 47 which cooperates with respectively corresponding keys 40 and 44 to cause the contacts to enter the splice in a pre-determined orientation in which the flattened portions 47 are positioned face to face.

The flattened portions 47, by virtue of their reduced sections are somewhat flexible and flex sufficiently upon insertion into the wire splice to pass over their respective cams 41 and 45 which are constructed so as to deflect the flattened portions 47 toward one another. The extreme forward end of the flattened portions 47 are slightly beveled to permit them to physically pass the ends of the other pin contact.

When the pin contacts 46 are fully pressed into position the shoulders 48 thereof are locked in "permanent" relationship by the locking tangs 49 of the retention clip. A spring loaded electrical contact is established between the flattened portions 47 of the pin contacts 48 by cams 41 and 45 urging these portions together.

It is to be noted that while the retention clip 43 is a double ended unitary structure, it could equally well be constructed as shown in FIG. 9 with the cams and keys forming a part of the body insulator.

FIG. 13 shows a cross-sectional view of the wire splice of FIG. 12 with the contacts in physical and eletcrical engagement with each other.

While not shown specifically, it is to be understood that each wire splice shown in the drawings could have a straight cylindrical insulating body or have a special interlocking configuration for modular construction. Similarly, each wire splice could include or exclude the sealing grommet.

While we have described our invention in conjunction with specific apparatus, it is to be understood that numerous variations and embodiments could be utilized without departing from the spirit of the invention.

What is claimed is:

In a device for electrically interconnecting two conductive pins, each said pin having an annular rib therearound spaced from the end thereof, the combination comprising: a conductive tube having a unitary central portion and two end portions fixed thereto, each said end portion having a pair of opposed leaf spring tangs extending radially inward and toward the center of the tube, said central portion having an inside diameter smaller than the outside diameter of said ribs, said tangs of each end portion being spaced from said central portion to permit a corresponding rib to be locked therebetween, said central portion having two pairs of opposed leaf spring tangs extending radially inward and toward the center of said tube on each side thereof, said central portion tangs extending inwardly a radial distance to bear against the ends of corresponding pins when inserted in said tube; and a sleeve of insulation fixed around said tube, said sleeve having an enlarged central portion, said enlarged central portion having male and female connecting parts therearound to mate with a like device.

References Cited

UNITED STATES PATENTS

| | | | |
|---|---|---|---|
| 2,257,317 | 9/1941 | Wade | 339—205 |
| 2,427,182 | 9/1947 | Bergan | 339—244 |
| 2,441,393 | 5/1948 | Buchanan et al. | 339—75 |
| 2,469,397 | 5/1949 | Mezek | 339—217 |
| 2,758,291 | 8/1956 | Richards | 339—205 X |
| 2,838,739 | 6/1958 | Winkler | 339—47 |
| 2,903,671 | 9/1959 | Dreher et al. | 339—198 |
| 3,090,027 | 5/1963 | Phillips et al. | 339—31 |
| 3,112,149 | 11/1963 | Bachman | 339—217 |
| 3,158,424 | 11/1964 | Bowen | 339—217 |

FOREIGN PATENTS

| | | |
|---|---|---|
| 58,709 | 5/1941 | Denmark. |

MARVIN A. CHAMPION, *Primary Examiner.*

PATRICK A. CLIFFORD, *Examiner.*